(12) United States Patent
Schommer

(10) Patent No.: US 6,783,113 B2
(45) Date of Patent: Aug. 31, 2004

(54) QUARTER-TURN VALVE

(76) Inventor: Alfred Stephen Schommer, 3710 W. Old Spanish Trail, New Iberia, LA (US) 70560

( * ) Notice: Subject to any disclaimer, the term of this patent is extended or adjusted under 35 U.S.C. 154(b) by 63 days.

(21) Appl. No.: 10/222,599

(22) Filed: Aug. 15, 2002

(65) Prior Publication Data

US 2004/0031944 A1 Feb. 19, 2004

(51) Int. Cl.$^7$ ............................................. F16K 31/00
(52) U.S. Cl. ........................ 251/292; 251/305; 137/556
(58) Field of Search .................................. 251/292, 305, 251/304, 315.01; 137/556, 556.3, 556.6

(56) References Cited

U.S. PATENT DOCUMENTS

| | | | | |
|---|---|---|---|---|
| 234,377 A | * | 11/1880 | Fetterly et al. | 251/292 |
| 668,882 A | * | 2/1901 | O'Meara | 251/292 |
| 829,485 A | * | 8/1906 | O'Meara | 251/292 |
| 871,869 A | * | 11/1907 | Gordon | 251/292 |
| 1,043,403 A | * | 11/1912 | Curtin | 251/305 |
| 1,086,982 A | * | 2/1914 | Bahruth | 251/292 |
| 1,111,865 A | * | 9/1914 | Serrell | 251/293 |
| 1,132,095 A | * | 3/1915 | Hutchison | 137/556.6 |
| 1,807,490 A | * | 5/1931 | Milner | 137/556.3 |
| 2,140,292 A | * | 12/1938 | Jensen | 137/556.6 |
| 3,192,945 A | * | 7/1965 | Blakely | 251/308 |
| 3,589,575 A | * | 6/1971 | Scaramucci | 251/306 |
| 5,127,628 A | | 7/1992 | Kemp | |
| 5,588,460 A | | 12/1996 | Meneses | |

OTHER PUBLICATIONS

American Petroleum Institute, Butterly Valves: Double Flanged Lug–and–Wafer–Type, May 1997, Fifth Edition.
AUMA, Part–turn gearboxes, 9 pages.

* cited by examiner

*Primary Examiner*—John Bastianelli
(74) *Attorney, Agent, or Firm*—William W. Stagg

(57) ABSTRACT

An improved quarter-turn valve having an improved valve stem and handle is presented. The valve stem has four substantially square sides of desired predetermined dimensions and a top surface. The valve stem dimensions may conform to ISO 5211. The valve stem has a keyway extending vertically along one of its sides and a position indicator line extending diagonally across its top surface to positively indicate the status of the valve, whether open or closed. The valve handle valve handle has a substantially square bore that conforms to the side dimensions of the valve stem and a key that extends into the valve handle bore at a desired location. The key conforms to the dimensions of the valve stem keyway so that the handle may be attached to the valve stem only in a desired position with respect to the position indicator line so that the status of the valve, whether open or closed, is indicated by the valve handle as well as the position of the position indicator line.

19 Claims, 6 Drawing Sheets

QUARTER-TURN VALVE

FIELD OF INVENTION

The present invention generally relates to the field of valves and actuators and more particularly relates to an improved valve stem and handle configuration for quarter-turn valves. The design for the valve employs a "modified" square shaped valve stem and a corresponding valve lever. The valve stem and valve lever are keyed so that the valve lever can be fitted to the valve stem only in a manner that will provide a positive visual indication of the valve position, whether open or closed, as the valve stem is turned.

BACKGROUND OF INVENTION

Valve actuators are devices designed for attachment to an industrial valve in order to transmit torque to a valve stem in order to provide for the operation of the valve. Valves typically are actuated by electrical, pneumatic, hydraulic, or manual means or by a combination of these means. Applicant presents a design for a valve stem configuration for quarter-turn valves such as butterfly valves and ball valves that complies with both domestic and international design standards. Applicant's design also allows for actuators and gear operators that are in compliance with the standards of the International Standards Organization (ISO) to be directly mounted or attached to the valve stem without the need or use of adaptors, brackets, drivers or excessive fastening hardware.

ISO Standard 5211 provides for limitations on the maximum torque that can be transmitted though the mounting flange of a valve and actuator and also places limitations on the dimensions of the driving components for valves and actuators. In the case of valves and actuators having square heads, the ISO standards impose limitations on the dimensions of the head of the valve stem and the actuator output shaft. In addition to the ISO standards, the American Society of Mechanical Engineers and the American National Standards Institute (ASTM/ANSI) publishes and maintain certain standards for quarter-turn valves. For instance ASTM/ANSI B16.34 provides, at Section 6.5.2, the following requirements for the position indication of valve stems:

6.5.2 Position Indication. Valves of the quarter-turn type (e.g., ball, plug, or butterfly) shall have a means to indicate the ball, plug, or disc position. The design shall be such that the components of the indicating means cannot be assembled to falsely indicate the valve open or closed position.

Applicant provides a design for quarter-turn valves having substantially square valve stems that conform to the sizing requirements imposed by the ISO specifications. In addition the valve stem and handle assembly is uniquely configured to provide for a positive indication of the valve position, i.e. whether the valve is open or closed. Because the configuration of the valve stem conforms to the dimensional requirements for substantially square valve stems, the valves of Applicant's design may be fitted with actuators that conform to the ISO specifications without the use of adaptors or other modifications.

SUMMARY OF INVENTION

Applicant proposes a new design for quarter-turn valves. The design incorporates a valve stem configured in a "modified" square design that conforms to ISO dimensional requirements for square stemmed valves. Applicant's design also provides means to indicate the valve open or closed position that conforms to the ASME\ANSI requirements for position indication of the valve disc or ball. The valve stem of Applicant's design has four sides of a substantially square configuration. A vertical groove or keyway is placed on one of the sides of the valve stem. The valve includes a detachable turning lever. The turning lever has a substantially square bore that conforms to the valve stem dimensions and a protruding key located in the bore that matches with the keyway of the valve stem. The key is located so that the turning lever may be mounted to the stem in only one desired position. Because the valve stem conforms to ISO dimensional standards, it may be used with ISO compliant actuators without adaptors or intermediate fittings.

DESCRIPTION OF EMBODIMENTS

Figure 1:
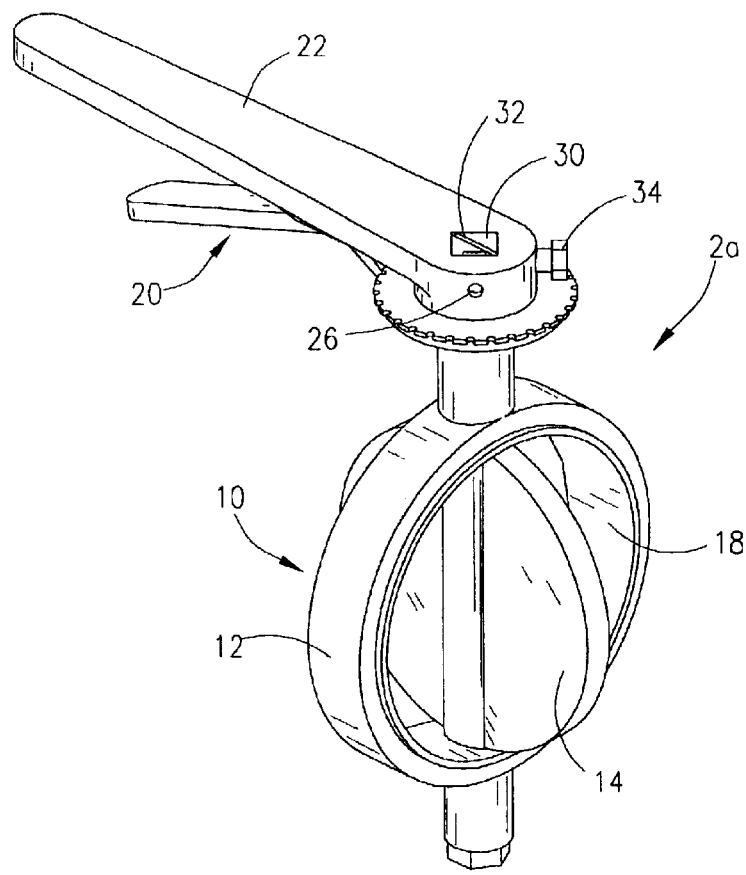
FIG. 1 is an isometric view of a butterfly valve having the valve stem and lever of Applicant's invention, the valve shown being in an open position.

Referring now to the drawings and more particularly to FIG. 1, there is shown in perspective view of a quarter-turn valve (10) of Applicant's invention. FIG. 1 shows the valve (10), in this case a butterfly valve, in an open position designated (2a). The valve (10) has a body (12); in this case a ring typically made from ductile iron, cast iron, bronze, stainless steel, composites or from other suitable materials, a valve disc (14) and a valve stem (30). The valve disc (14) is pivotally mounted within the valve body (12) to open and close the valve bore (18) when the valve disc (14) is pivoted by means of an attached valve stem (30). The valve (10) has bearings, not shown, to facilitate the pivotal rotation of the valve disc (14). The valve handle assembly (20), having an extending valve handle (22), is utilized to turn the valve stem (30) and, correspondingly, pivot the valve disc (14).

Figure 2:
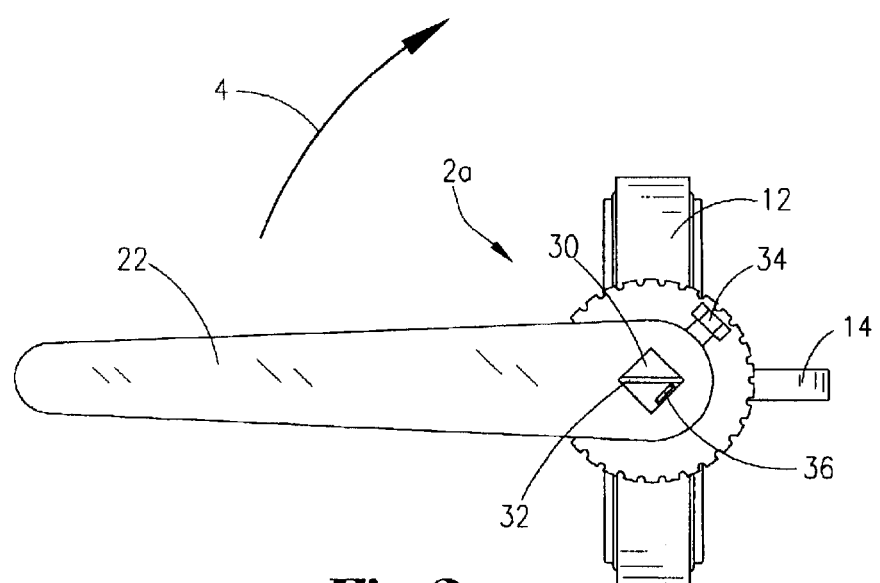
FIG. 2 is a top view of the valve and valve stem of FIG. 1.

As shown in FIG. 2, a top view of the valve in FIG. 1, the valve stem (30) has substantially square side dimensions. These side dimensions are intended to conform to the requirements of the ISO specifications, particularly ISO 5211. The stem (30) has a position indicator line groove (32) that extends diagonally across the stem face (31) of the valve stem (30). The valve stem (30) is mounted within the valve body (12) and to the valve disc (14) so that the position indicator line or groove (32) is oriented parallel to the plane of the valve disc (14).

When the bore (18) of the valve (10) is in the open position (2a), the disc (14) is positioned perpendicular to the body (12). When the disc (14) is so positioned, the handle (22) of the handle assembly (20) is positioned on the valve stem (30) in a manner that places the handle (22) parallel to the plane of the disc (14). Similarly, when the valve (10) is in the open position, the position indicator groove (32) on the valve stem (30) is placed parallel to and in line with the plane of the valve disc (14), perpendicular to the body (12) of the valve (10) so as to positively indicate the position of the disc (14) in relation to the valve bore (18) and thereby an open valve bore (18). To close the valve (10) the handle (22) is pivoted in the direction indicated as (4) so as to pivot the stem (30) and, correspondingly the disc (14), parallel to the body ring (12) and thereby close the bore (18).

Figure 3:
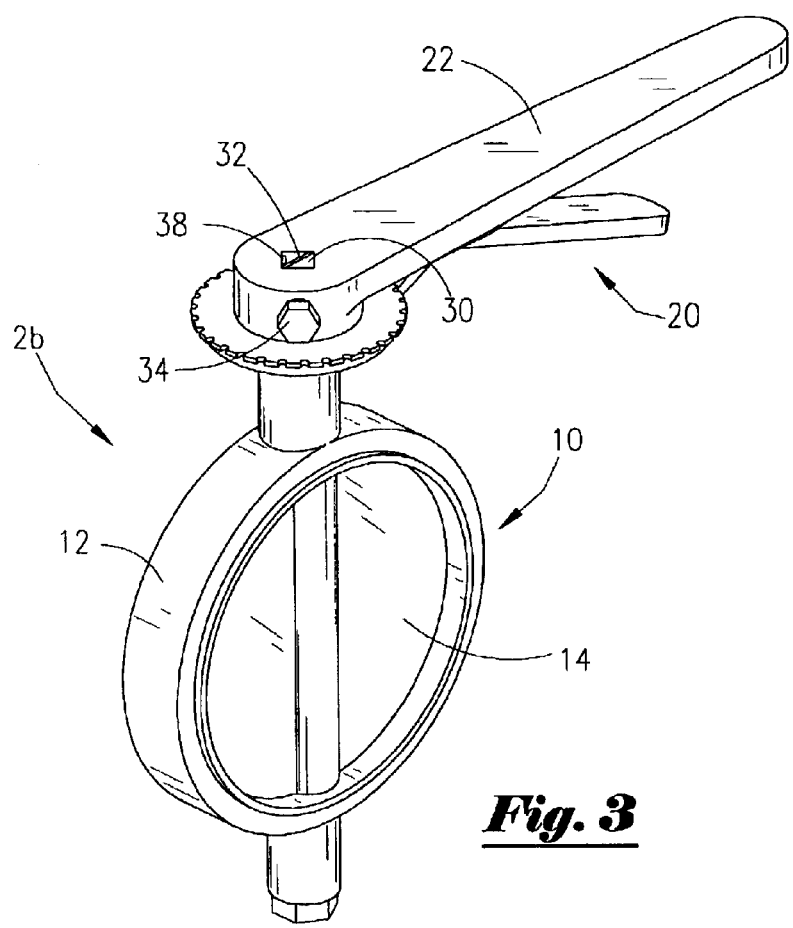
FIG. 3 is an isometric view of the valve of FIG. 1, the valve shown being in a closed position.
Figure 4:
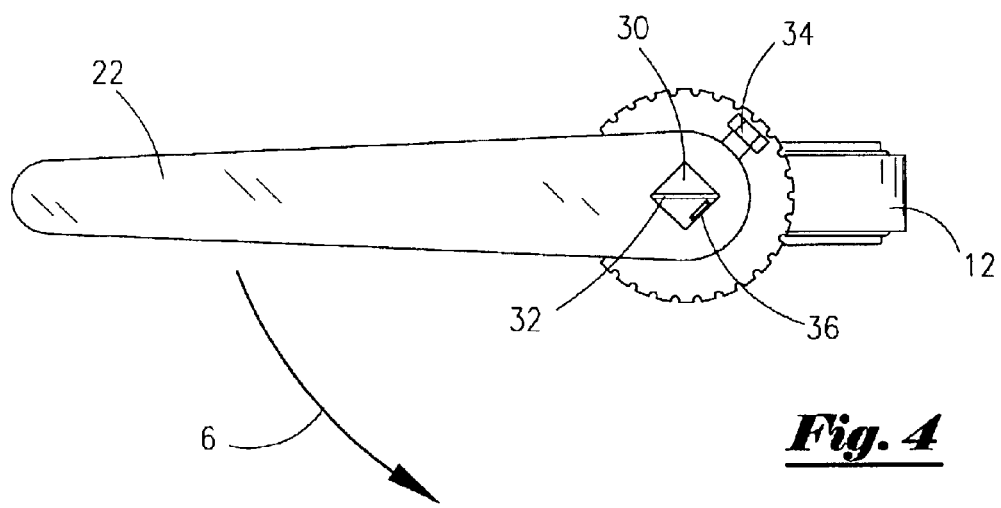
FIG. 4 is a top view of the valve and valve stem configuration shown in FIG. 3.

FIG. 3 and FIG. 4 illustrate the valve bore (18) of the valve (10) in a closed position designated as (2b). The handle (22) of the handle assembly (20) is still positioned on the valve stem (30) in a manner that positions the handle (22) parallel to the disc (14). When the handle (22) is so positioned, the position indicator groove (32) of the valve stem (30) is also positioned parallel to and in line with the valve disc (14). When the bore (18) of the valve (10) is in the closed position (2b), the position indicator groove (32) is parallel to the body ring (12) so as to positively indicate the position of the disc (14) in relation to the valve bore (18) and thereby a closed valve bore (18). To open the valve (10), the handle (22) is pivoted in the direction indicated as (6) so as to pivot the stem (30) and, correspondingly the disc (14), perpendicular to the body ring (12) and thereby open the bore (18).

Figure 5:
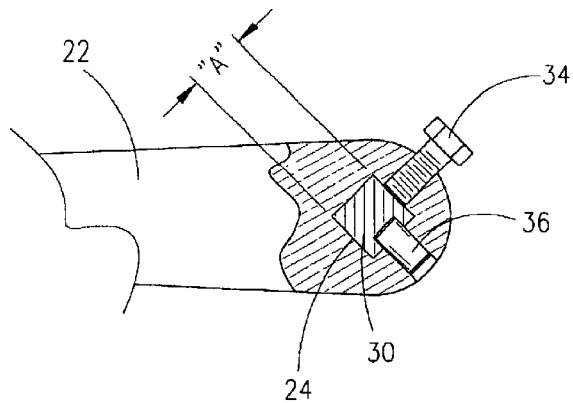
FIG. 5 is a top cutaway view of the valve stem and handle configuration.

Referring now to FIG. 5, there is shown a partial cutaway view of the handle (22) of the handle assembly (20) positioned on the valve stem (30) of the valve (10). The handle (22) has a square bore (24) having side dimensions (A) that conform to the ISO dimensional standards. The handle has a key bore (26) with a corresponding pin or key (36) that protrudes into the bore (24) of the handle (22). The protruding key (36) conforms to the keyway (38) of the valve stem (30) on which the bore (24) is positioned. The key (36) is located within the bore (24) of the handle (22) in such a manner that the handle (22) can be fitted onto the valve stem (30) of the valve (10) only when the key (36) is fitted into the keyway (38).

When the handle (22) is properly fitted onto the valve stem (30), the handle (22) will be in line with the indicator groove (32) of the valve stem (30) as shown in FIG. 2 and FIG. 4. When properly positioned, a setscrew (34) is used to fix the handle (22) in place on the valve stem (30).

Figure 6:
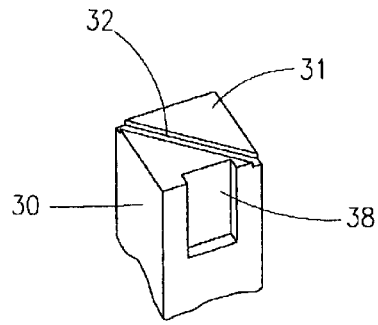
FIG. 6 is a partial isometric view of the valve stem of FIG. 1.

FIG. 6, a partial view of the valve stem (30), illustrates the position of the diagonally orientated indicator groove (32) on the stem face (31) in relation to the position of the keyway (38).

Figure 7:
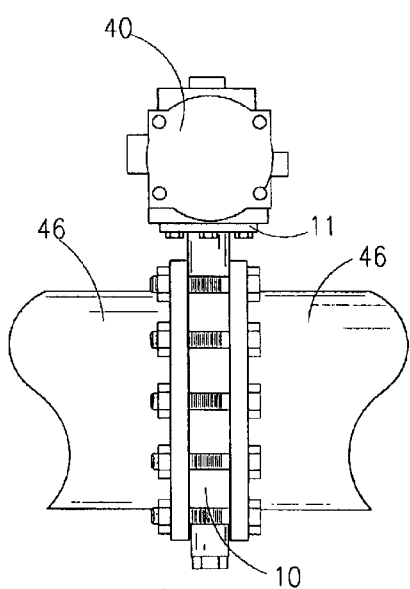
FIG. 7 is a side view of the valve of Applicant's invention fitted with an ISO compliant actuator.
Figure 8:
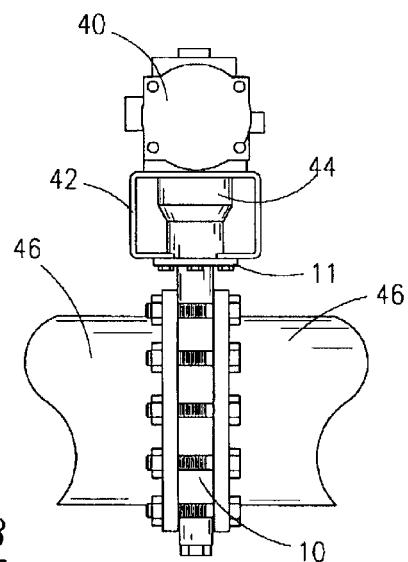
FIG. 8 is a side view of a valve without a square valve stem, not in compliance with ISO standards, having an adaptor for attachment of an ISO compliant actuator.

FIG. 7 is a side view of a pipe (46) fitted with a valve (10) of Applicant's invention. Because valve (10) incorporates a substantially square valve stem (30) that conforms to the dimensional requirements of the ISO standards, and particularly ISO 5211, valve (10) may be used with an ISO compliant actuator (40) mounted to valve (10) by flange means (11) without the necessity of adaptors or other intermediate fittings. As shown in FIG. 8, a conventional valve (10) fitted on a pipe (46) having a valve stem that does not conform to the standards of ISO 5211 will require the use of an adaptor bracket (42) mounted to flange means (11) to the valve (10) in conjunction with an ISO compliant stem extension piece (44) mounted to the valve stem to accommodate an ISO compliant actuator (40).

Figure 9:
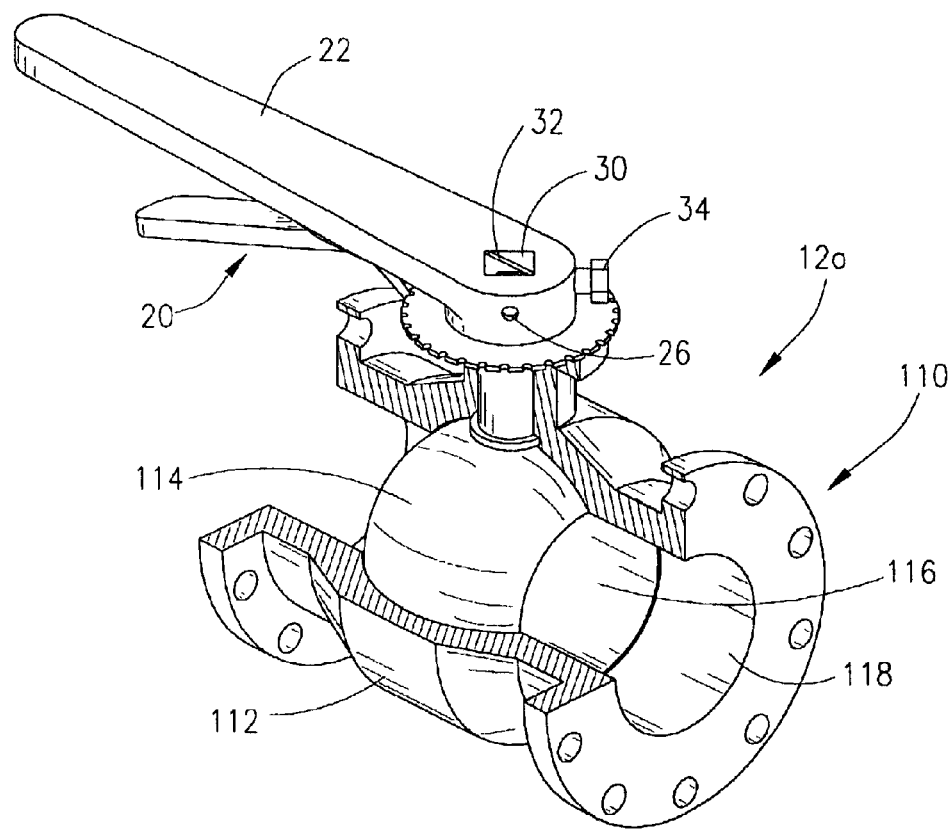
FIG. 9 is an isometric sectional view of a ball valve having the valve stem and lever of Applicant's invention, the valve shown being in an open position.

FIG. 9 shows another embodiment of a quarter-turn valve of Applicant's invention, in this case a ball valve (110), in an open position designated (12a). The valve (110) has a body (112) typically made from ductile iron, cast iron, bronze, stainless steel, composites or other suitable materials, a valve ball (114), a valve bore (118) and a valve stem (30). A ball bore (116) runs completely through the valve ball (114). The valve ball (114) is attached to the valve stem (30) and the valve ball (114) is pivotally mounted within the valve body (112) in the valve bore (118) so that the valve ball (114) may be pivoted to position the ball bore (116) as desired and thereby open and close the valve bore (118) of the valve (110). The valve ball (114) is pivoted by means of the attached valve stem (30) and the corresponding valve handle assembly (20) previously described and illustrated in FIG. 5 and FIG. 6. The extending valve handle (22) of the valve handle assembly (20) is utilized to turn the valve stem (30) and, at the same time, pivot the valve ball (114).

Figure 10:
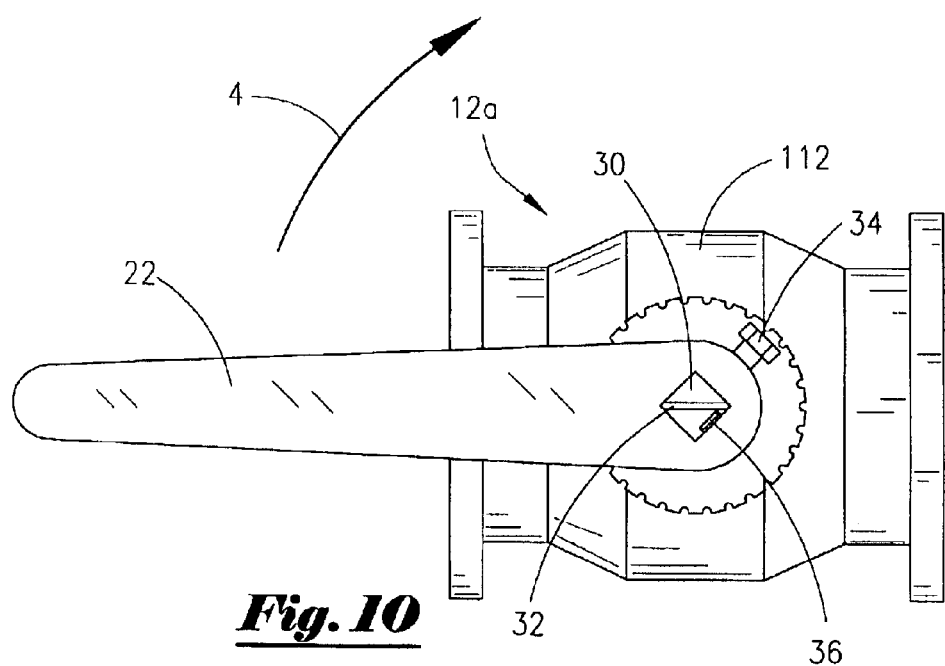
FIG. 10 is a top view of a ball valve having the valve stem and lever of Applicant's invention, the valve shown being in an open position.

As shown in FIG. 10, a top view of the valve shown in FIG. 9, the valve stem (30) has substantially square side dimensions. These side dimensions are intended to conform to the requirements of the ISO specifications, particularly ISO 5211. The stem (30) has a position indicator line groove (32) that extends diagonally across the stem face (31) of the valve stem (30) and a keyway for receiving the protruding key (36) of the valve handle (22). The valve stem (30) is mounted within the valve body (112) and to the valve ball (114) so that the position indicator line or groove (32) is oriented parallel to the centerline of the valve bore (116).

When valve (110) is in the open position (12a), the ball bore (116) of the valve ball (114) is positioned concentrically with the centerline of the valve bore (118). When the ball bore (116) is so positioned, the handle (22) of the handle assembly (20) is positioned on the valve stem (30) in a manner that places the handle (22) parallel to the centerline of the valve bore (118) and the ball bore (116). Similarly, when the valve (110) is in the open position, the position indicator groove (32) on the valve stem (30) is placed parallel to the centerline of the valve bore (118) and the ball bore (116) so as to positively indicate the position of the ball bore (116) in relation to the valve bore (118) and thereby an open valve bore (118). To close the valve (10) the handle (22) is pivoted in the direction indicated as (4) so as to pivot the stem (30) and, correspondingly the valve ball (114), to place the ball bore (116) perpendicular to the centerline of the valve bore (118) and thereby close the valve bore (118) and the valve (110).

Figure 11:
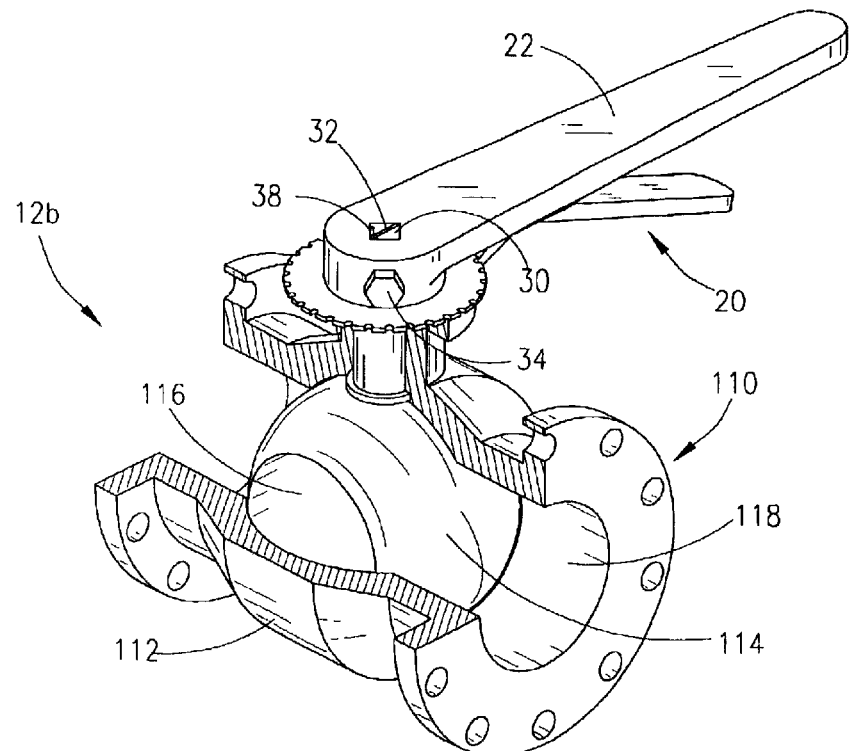
FIG. 11 is an isometric sectional view of the valve of FIG. 9, the valve shown being in a closed position.
Figure 12:
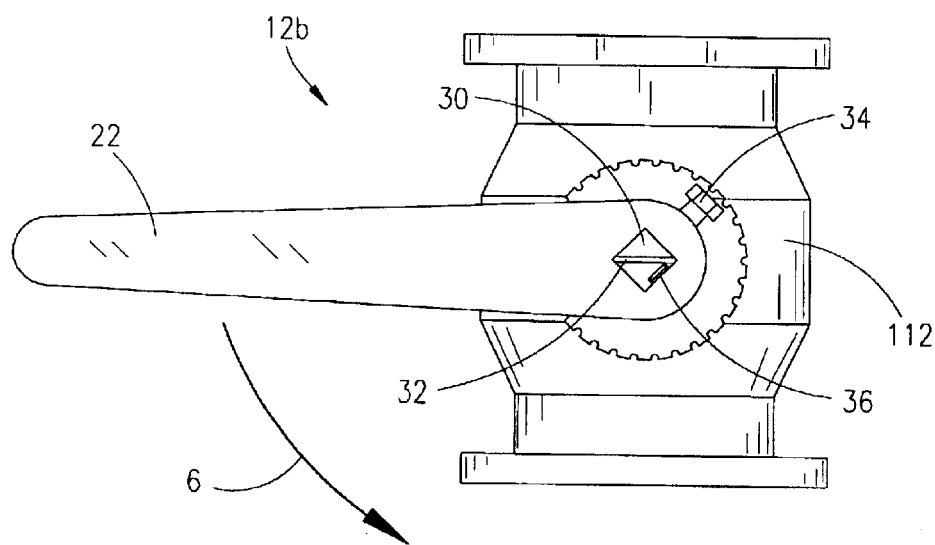
FIG. 12 is a top view of a ball valve having the valve stem and lever of Applicant's invention, the valve shown being in a closed position.

FIG. 11 and FIG. 12 illustrate the valve bore (118) of the valve (110) in a closed position designated as (12b). The handle (22) of the handle assembly (20) is still positioned on the valve stem (30) in a manner that positions the handle (22) parallel to the centerline of the ball bore (116). When the handle (22) is so positioned, the position indicator groove (32) of the valve stem (30) is positioned parallel to the centerline of the ball bore (116). When the valve (110)

is closed, the handle (22) and the indicator grove (32) are positioned perpendicular to the centerline of the valve bore (118) so as to positively indicate the position of the ball bore (116) in relation to the valve bore (118) and thereby a closed valve bore (118). To open the valve (110), the handle (22) is pivoted in the direction indicated as (6) so as to pivot the stem (30) and, correspondingly the ball (114) and ball bore (116) in line with the centerline of the valve bore (118) and thereby open the bore (118) and the valve (110).

Figure 13:
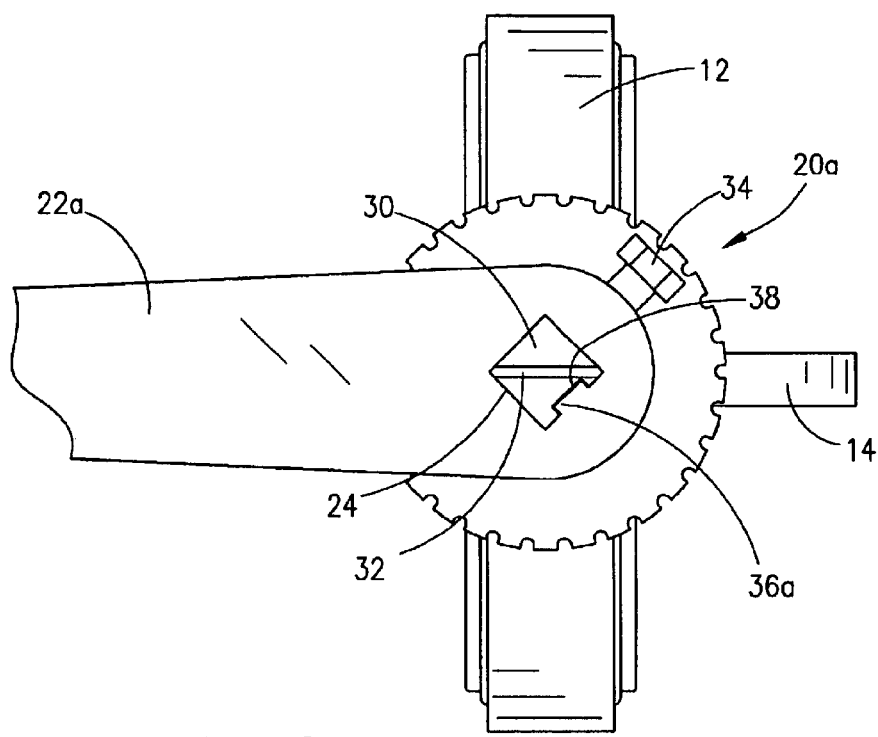
FIG. 13 is a top view of an alternate embodiment of the handle and valve stem of applicant's invention.
Figure 14:
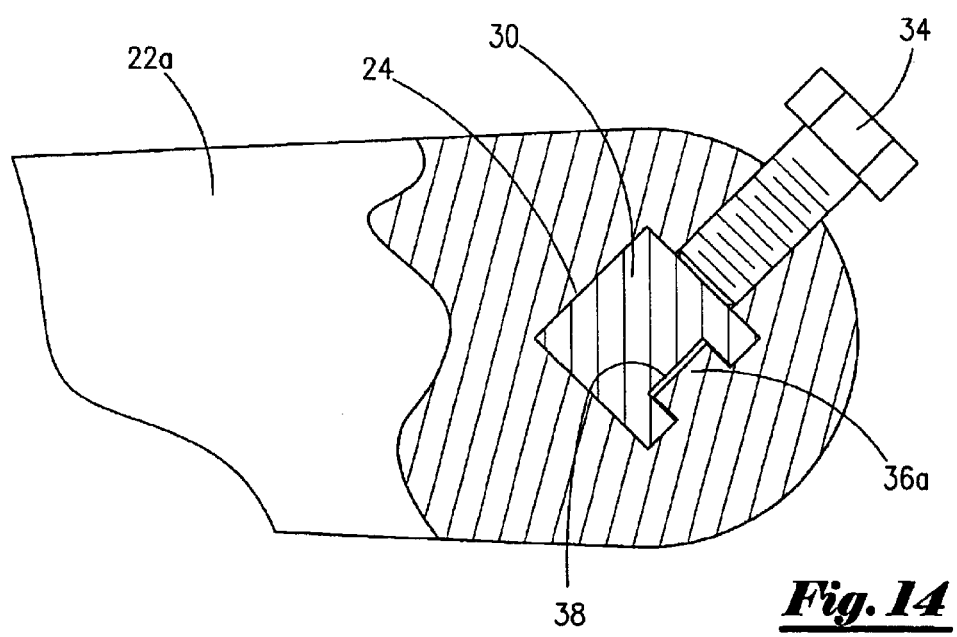
FIG. 14 is a top cutaway view of the handle and valve stem and shown in FIG. 13.

Referring now to FIG. 13, a top view of an alternate embodiment of the handle and valve stem of applicant's invention, there is shown the alternate handle (22a) of the alternate handle assembly (20a) positioned on the valve stem (30) of the valve (10). The handle (22a) has a square bore (24) having side dimensions (A) that conform to the ISO dimensional standards for square head valve stems. The handle has a key bore (24) and is formed with key (36a) that protrudes into the bore (24) of the handle (22). The key (36a) is located within the bore (24) of the handle (22) in such a manner that the handle (22) can be fitted onto the valve stem (30) of the valve (10) only when the key (36a) is fitted into the keyway (38). FIG. 14, a cutaway view of FIG. 13, shows the relationship between the key (36a) and the keyway 38 of the handle (22a).

It is thought that the improved quarter-turn valve and method of the present invention and many of its attendant advantages will be understood from the foregoing description and it will be apparent that various changes may be make in the form, construction and arrangement of the parts thereof without departing from the spirit and scope of the invention.

I claim:

1. A valve comprising:
    (a) a body forming a valve bore;
    (b) a closing means pivotally mounted to said body within said valve bore;
    (c) a valve stem extending from said body for pivotally rotating said closing means to open and close said valve bore, said valve stem having desired predetermined side dimensions and a top surface;
    (d) a keyway extending vertically along said valve stem;
    (e) a valve handle for turning said valve stem and thereby said closing means said valve handle having a bore conforming to the shape of said valve stem; and
    (f) a key extending into said bore of said valve handle whereby said handle may be attached to said valve stem only in a single position with said key fitted in said keyway whereby the status of said valve, whether open or closed, is indicated by the position of said handle.

2. The valve as recited in claim 1 further comprising, a position indicator line extending diagonally across said top surface of said valve stem whereby the status of said valve, whether open or closed, is indicated by the position of said position indicator line.

3. The valve as recited in claim 2 wherein, said valve stem has four substantially square sides of desired predetermined dimensions.

4. A quarter-turn valve comprising:
    (a) a frame having a valve bore;
    (b) valve opening and closing means pivotally mounted to said frame within said valve bore;
    (c) a valve stem for pivoting said valve opening and closing means, said valve stem having a substantially square cross-section and a substantially square stem top face and a keyway positioned on one side of said valve stem;
    (d) a valve handle having a substantially square bore for rotating said valve stem and thereby pivoting said valve opening and closing means to open and close said valve bore, said valve handle having a key projecting into said square bore of said valve handle, said key whereby said valve handle may be positions on said valve stem in only one position; and
    (e) a line positioned on said valve stem top face whereby the status of said valve bore, whether open or closed, is indicated by the position of said line.

5. The valve as recited in claim 4 wherein said line positioned on said valve stem top face is a groove cut into said valve stem top face.

6. The valve recited in claim 4 wherein, said valve stem dimensions conform to the standards of ISO 5211.

7. The valve recited in claim 6 wherein, said valve is a ball valve.

8. The valve recited in claim 6 wherein, said valve is a butterfly valve.

9. In a quarter-turn valve having a frame, a pivoting valve opening and closing means, and a valve stem for pivoting the valve opening and closing means, an improved a valve stem comprising:
    (a) an elongated valve stem having substantially square sides and a top face;
    (b) a keyway positioned on one of said sides of said valve stem;
    (c) an elongated handle for turning said valve stem, said handle having a substantially square bore conforming substantially to said sides of said valve stem; and
    (d) a key protruding into said bore of said handle whereby said handle may be positioned on said valve stem only in a single position whereby the status of said valve, whether opened or closed, may be determined by the position of said handle.

10. The valve recited in claim 9 further comprising an indicator line positioned diagonally across said top face of said valve stem whereby the position of said valve opening and closing means may be determined by the position of said indicator line when said valve stem is turned.

11. The improved valve stem recited in claim 10 wherein the dimensions of said valve stem conform to standards of ISO 5211.

12. The improved valve stem recited in claim 11 further comprising a setscrew for fixing said valve handle onto said valve stem.

13. A valve comprising:
    (a) a body forming a valve bore;
    (b) a disc for opening and closing said valve bore pivotally mounted to said body within said valve bore;
    (c) a valve stem extending from said body for pivoting said disc to open and close said valve bore, said valve stem having four substantially square sides of desired predetermined dimensions and a top surface;
    (d) a keyway extending vertically along one of said sides of said valve stem;
    (e) a valve handle for turning said valve stem, said valve handle having a substantially square bore conforming to the sides of said valve stem; and
    (f) a key extending into said bore of said valve handle whereby said handle may be attached to said valve stem only in a single position with respect to said disc whereby the position of said disc with respect to said valve bore is indicated by the position of said handle when said valve stem is turned with said valve handle.

14. The valve as recited in claim 13, further comprising a position indicator line extending diagonally across said top surface of said valve stem in line with and parallel to the position of said disc whereby when said stem is turned the position of said disc is indicated by the position of said position indicator line.

15. The valve as recited in claim 14 wherein said position indicator line is a groove cut into said top surface of said valve stem.

16. A valve comprising:
   (a) a body forming a valve bore;
   (b) a ball having a ball bore for opening and closing said valve bore, said ball being pivotally mounted to said body within said valve bore;
   (c) a valve stem extending from said body for pivoting said ball and said ball bore to open and close said valve bore, said valve stem having four substantially square sides of desired predetermined dimensions and a top surface;
   (d) a keyway extending vertically along one of said sides of said valve stem;
   (e) a valve handle for turning said valve stem, said valve handle having a substantially square bore conforming to the sides of said valve stem; and
   (f) a key extending into said bore of said valve handle whereby said handle may be attached to said valve stem only in a single position with respect to the position of said ball bore whereby the position of said ball bore with respect to said valve bore is indicated by the position of said handle when said valve stem is turned with said valve handle.

17. The valve as recited in claim 16 further comprising a position indicator line extending diagonally across said top surface of said valve stem in line with and parallel to the position of said ball bore whereby when said stem is turned the position of said ball bore is indicated by the position of said position indicator line.

18. The valve as recited in claim 17 wherein said position indicator line is a groove cut into said top surface of said valve stem.

19. The valve as recited in claim 3 wherein said position indicator line is a groove cut into said top surface of said valve stem.

* * * * *